United States Patent Office 3,505,290
Patented Apr. 7, 1970

3,505,290
REDOX POLYMERIZATION OF ACRYLONITRILE WITH COMONOMERS IN THE PRESENCE OF ALKALI METAL SULFATES
Corrado Mazzolini, Via Poerio 19, and Sergio Lo Monaco, Via Piave 108, both of Mestre, Venice, Italy
No Drawing. Continuation of application Ser. No. 374,273, June 11, 1964. This application Mar. 19, 1968, Ser. No. 714,356
Claims priority, application Italy, June 18, 1963, 12,646/63
Int. Cl. C08f 15/36, 15/38
U.S. Cl. 260—63                                           6 Claims

ABSTRACT OF THE DISCLOSURE

Improvements have been observed where redox polymerization of acrylonitrile is conducted in the presence of alkali metal sulfates.

This application is a continuation of application Ser. No. 374,273 filed on June 11, 1964, now abandoned.

The present invention relates to a method of obtaining acrylonitrile copolymers and shaped bodies, such as fibers and filaments derived therefrom. In particular, the invention refers to a method of polymerization for obtaining high yields of acrylonitrile copolymers and polymer mixtures suitable for the preparation of fibers and filaments of a high degree of whiteness and heat stability and good dyeing properties with basic dyestuffs.

Acrylonitrile polymers containing about 85% or more acrylonitrile are commonly prepared from aqueous solutions of monomers of dispersions, using redox systems as catalysts.

Although this method is satisfactory with regard to the yield, the polymers produced are not as white as desired and are not resistant to discoloration upon heating.

In the preparation of fibers, the acrylonitrile polymer is dissolved in an organic solvent such as N,N-dimethylformamide which requires heating the suspension of polymer in the solvent until completely dissolved. The solution continues to be held at a high temperature while it is filtered and spun. Any degradation in color inherent in the polymer thus is present in the fibers produced from it and no practical method is known today which makes it possible to bleach them. At times a bleach is used, but this does not lead to a permanent removal of the color, since the bleached products yellow again upon exposure to ultraviolet rays.

It has now been discovered by the applicants, and this forms the subject matter of the present invention, that it is possible to obtain in high yields, acrylonitrile polymers containing at least 85% by weight acrylonitrile which have an exceptional degree of whiteness and improved sensitivity to heat, suitable for the obtaining of fibers and filaments of high whiteness, good resistance to heat and good dyeability by basic dyestuffs, by effecting the polymerization of the acrylonitrile in the presence of water-soluble salts of elements of Groups I and II of the Periodic System with monomers which are adapted to increase the dyeing properties, employing redox catalyst systems in an activator:catalyst ratio of less than 6.

In accordance with one of the preferred methods of carrying out the present invention, the polymerization of the acrylonitrile with a vinyl monomer having large side groups of steric dimensions, i.e. bulky as regards their component atomic arrangement and size as compared with the simple vinyl portion, attached to the vinyl portion thereof with or without a comonomer having an acid function available for the attachment of the basic dyestuffs is carried out using a redox catalyst composed of peroxide compounds, such as sodium or potassium persulfate, and reducing agents, such as sulfurous anhydride, pyrosulfites, sodium or potassium metabisulfites, with an activator:catalyst ratio maintained preferably between about 3 and 7%, operating in aqueous medium with a water:monomer ratio of between about 3:1 and about 7:1 at temperatures between about 40° C. and about 60° C. and at a pH maintained below about 7, preferably between about 2.5 and 3.5, regulating it by suitable addition of sodium bicarbonate.

Although those skilled in the art will appreciate that the invention may be applied to polymerization systems including acrylonitrile and one or more vinyl monomers broadly, vinyl monomers having large side groups of steric structure attached to the vinyl portion of the molecule are preferred. Examples of such monomers are as follows:

Methyl-methacrylate, ethyl-methacrylate, butyl-methacrylate, octyl-methacrylate, methoxy-ethyl-methacrylate, phenyl-methacrylate, cyclo-hexyl-methacrylate, dimethylamido-ethyl-methacrylate and the corresponding esters of acrylic acid, acrylamides and methacrylamides or their alkyl-substituted products, unsaturated ketones, such as methylvinyl ketone, phenyl-vinyl-ketone, methyl isopropenyl ketone and the like; vinyl carboxylates such as vinyl formate, vinyl acetate, vinyl propionate, vinyl-butyrate, vinyl thioacetate, vinyl benzoate, esters of ethylene carboxylic acids such as maleic, fumaric, citraconic, mesaconic, or aconic acids, N-alkyl-maleimides, N-vinyl carbazole, N-vinyl succinimide, N-vinyl phthalimide, vinyl ethers, styrene and their alkyl derivatives.

The comonomer having an acid function available for the attachment of the basic dyestuffs copolymerizable with acrylonitrile may be selected from the group consisting of itaconic acid, cinnamic acid, maleic acid or anhydride, carboxy vinyl phthalic acid, vinyl benzene sulfonic acid, allyl sulfonic acid, allyl oxysulfonic acid, methallyl oxyethylsulfonic acid, allyl-thioethyl sulfonic acid, isopropenyl benzene sulfonic acid, vinyl bromobenzene sulfonic acid, vinyl fluorobenzene sulfonic acid, vinyl ethyl benzene sulfonic acid and the like, and the corresponding salts of an alkaline metal or ammonium; vinyl dichlorobenzene sulfonic acid, vinyl trihydroxy benzene sulfonic acid, acetylethylene sulfonic acid, naphthyl ethylene sulfonic acid, propene sulfonic acid and the like, and the corresponding salts of an alkaline metal or ammonium and furthermore sodium p-methylacrylamidobenzene sulfonate; sodium p-methylallyl-ether benzene sulfonate, sodium methallylsulfonate, sodium methacrylamido-benzene sulfonate and the like.

By operating in accordance with the present invention, there are obtained higher yields of conversion than when operating in the absence of salts and the copolymers obtained have excellent properties of original color and sensitivity to heat, so that they are particularly well suited for the obtaining of fibers and filaments of high whiteness and color stability which can be used satisfactorily in the preparation of any textile product.

In order to be able better to show the advantages and results of the present invention, there are given the following examples and tables, Table I setting forth the degree of whiteness and sensitivity to heat of the polymers while Table II contains the properties of the fibers obtained from the said polymers.

From the table, it is evident that for the same initiator and viscosity of the polymers, the presence of the salts substantially improves the original color and the sensitivity to heat both of the polymers and of the fibers, at the same time increasing the conversion.

EXAMPLE 1

Into a 3-liter polymerization reactor, there are continuously fed two aqueous streams containing the quantities of 0.6 part of catalyst $K_2S_2O_8$ and 1.30 parts of activator $SO_2$ partially neutralized with $NaHCO_3$, with an activator:catalyst ratio of 2.2 and a stream of monomers composed of a mixture of acrylonitrile (91.9 parts by weight) of vinyl acetate (8.1 parts by weight).

The total amount of water introduced is 2.3 liters per hour and the quantity of monomer is 0.5 liter per hour.

The reaction temperature is maintained at about 50° C. The aqueous suspension of polymer obtained is discharged from an overflow tube, filtered, washed repeatedly with water, with acetone and then again with water to eliminate all the foreign substances and the unreacted monomers, and dried in an oven at 80° C. for 12 hours.

Under standard conditions of polymerization, there are obtained about 350 to 400 grams per hour of copolymers in which the acrylonitrile and vinyl acetate are copolymerized in proportions of 93 to 7.

The following determinations were carried out on the copolymer obtained:

(1) Intrinsic viscosity ($\eta$) in dimethylformamide expressed in deciliter gram$^{-1}$.

(2) Original color of the polymer (for the evaluating of the color) reference is had to the C.I.E. system of color representation measurement. In this system, the color is expressed in terms of dominant wavelength (DWL), purity (P) and brightness (B), referred to the standard illuminant C (source of emission corresponding to a black body of 6200° K.).

$$W = \frac{B - 1.8p^{*2} - 9.6}{0.00825}$$

in which B=brightness
p*=purity multiplied by a correction factor
F=$f$(DWL)
(cf. Journal of the Optical Society of America—vol. 28, page 52–1938 and publications of the National Bureau of Standards in Paper Trade Journal—vol. 103–108, page 38, 1936).

(3) Heat sensitivity—given by the variation in color.

(4) Dyeability, given by the quantity of dyestuff Sevron Blue 2G fixed by a solution of 7 gram/liter in a bath at 100° C. for 2 hours in which the polymer/bath ratio is about 1:20. The results of the measurements carried out are set forth in Table 1.

EXAMPLE 2

The polymerization described in Example 1 is repeated, using an amount of catalyst of 0.6 part and an amount of activator of 1.38 parts with an activator:catalyst ratio of 2.3:1 in the presence of 5% by weight sodium sulfate. The results of the measurements carried out on the polymer obtained are set forth in Table 1.

EXAMPLE 3

The polymerization of Example 1 was repeated, using an amount of catalyst of 0.4 part and an amount of activator of 0.92 part with an activator:catalyst ratio of 2.3:1 in the presence of 3% by weight sodium sulfate. The results of the measurements carried out on the resultant polymer are set forth in Table 1.

EXAMPLE 4

The polymerization of Example 1 was repeated, using an amount of catalyst of 0.4 part and an amount of activator of 0.92 part with an activator:catalyst ratio of 2.3:1 in the presence of 6% magnesium sulfate. The results of the measurements carried out on the resultant polymer are set forth in Table 1.

EXAMPLE 5

The polymerization of Example 1 was repeated, using an amount of catalyst of 0.5 part and an amount of activator of 1.15 parts with an activator:catalyst ratio of 2.3 in the presence of 4% sodium sulfate.

The results of the measurements carried out on the resultant polymer are set forth in Table 1.

EXAMPLE 6

The polymerization of Example 1 was repeated, feeding 3.8 liters per hour of water and 0.835 liter per hour of monomers, using an amount of catalyst of 0.6 part and an amount of activator of 1.38 parts with an activator:catalyst ratio of 2.3:1 in the presence of 4% magnesium sulfate. The results of the measurements carried out on the resultant polymer are set forth in Table 1.

EXAMPLE 7

Into a 3 liter polymerization reactor, there were continuously fed two aqueous streams containing 0.5 part of catalyst $K_2S_2O_8$ and 1.5 parts of activator $SO_2$ partially neutralized with $NaHCO_3$ with an activator:catalyst ratio of 3:1 and a stream of monomers composed of a mixture of acrylonitrile (90.5 parts by weight), vinyl acetate (9 parts by weight) and cinnamic acid (0.5 part by weight). The amount of water fed is 2.3 liters per hour and the amount of monomers is 0.5 liter per hour.

The reaction temperature is maintained at about 50° C.; from an overflow tube, the aqueous suspension of resultant polymer discharges, is filtered, is washed repeatedly with water, with acetone and then again with water to eliminate all the foreign substances and the unreacted monomers, and is dried in an oven at 80° C. for 12 hours. Under the standard conditions of polymerization, there are obtained about 350 grams per hour of copolymer in which the acrylonitrile, the vinyl acetate and the cinnamic acid are copolymerzed in proportions of 92.5:7:0.5.

The results of the measurements carried out on the resultant copolymer are set forth in Table 1.

EXAMPLE 8

The polymerization described in Example 7 is repeated, using an amount of catalyst of 0.5 part and and amount of activator of 1.51 parts with an activator/catalyst ratio of 3:1 in the presence of 5% magnesium sulfate. The results of the measurements carried out on the resultant copolymer are set forth in Table 1.

EXAMPLE 9

In to a 3 liter polymerization reactor, there are continuously fed two aqueous streams containing 0.6 part of catalyst $K_2S_2O_8$ and 1.38 parts of activator $SO_2$ partially neutralized with $NaHCO_3$ with an activator:catalyst ratio of 2.3 and a stream of monomers composed of a mixture of acrylonitrile (90.5 parts by weight), vinyl acetate (9 parts of weight) and potassium vinyl benzene sulfonate (0.5 part by weight).

The amount of water fed is 2.3 liters per hour and the amount of monomers is 0.5 liter per hour.

The reaction temperature is maintained at about 50° C. The aqueous suspension of polymer obtained discharges from an overflow tube, is filtered, washed repeatedly with water, acetone, and then again with water to eliminate all the foreign substances and the unreacted monomers, and dried in an oven at 80° C. for 12 hours.

Under the standard polymerization conditions, there are obtained about 350 grams per hour of copolymers in which the acrylonitrile, the vinyl acetate and the potassium vinyl benzene sulfonate are copolymerized in proportions of 92.5:7:0.5.

EXAMPLE 10

The polymerization of Example 9 is repeated, using an amount of catalyst of 0.6 part and an amount of activator of 1.38 parts with an activator:catalyst ratio of 23:1 in the presence of 5% potassium sulfate.

The results of the measurement carried out on the resultant copolymer are set forth in Table 1.

EXAMPLE 11

Into a 3 liter polymerization reactor, there are continuously fed two aqueous streams containing 0.6 part of catalyst $K_2S_2O_8$ and 1.38 parts of activator $SO_2$ partially neutralized with $NaHCO_3$ with an activator:catalyst ratio of 2.3 and a stream of monomers composed of a mixture of acrylonitrile (93 parts by weight) and methylmethacrylate (7 parts by weight).

The amount of water fed is 2.3 liters per hour and the amount of monomers is 0.5 liter per hour.

The reaction temperature is maintained at about 50° C. The aqueous suspension of resultant polymer discharges from an overflow tube, is filtered, washed repeatedly with water, with acetone, and then again with water to eliminate all the foreign substances and the unreacted monomers and is dried in an oven at 80° C. for 12 hours.

Under standard polymerization conditions, there are obtained about 350 grams per hour of copolymer in which the acrylonitrile and the methylmethacrylate are copolymerized in proportions of 93:7.

The results of the measurements carried out on the resultant copolymer are set forth in Table 1.

EXAMPLE 12

The polymerization described in Example 11 is repeated, using an amount of catalyst of 0.6 part and an amount of activator of 1.38 parts with of an activator:catalyst ratio of 2.3:1 in the presence of 5% sodium sulfate.

The results of the measurements carried out on the copolymer are set forth in Table 1.

EXAMPLE 13

Into a 3 liter polymerization reactor, there are continuously fed two aqueous streams containing 0.8 part of catalyst $K_2S_2O_8$ and 0.8 part of activator $SO_2$ partially neutralized with $NaHCO_3$, with an activator:catalyst ratio of 1:1 and a stream of monomers composed of a mixture of acrylonitrile (90.5 parts by weight), vinyl acetate (9 parts by weight) and sodium benzene sulfonate p-methylallyl ether

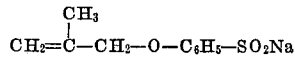

(0.5 part by weight).

The amount of water fed is 2.3 liters per hour and the amount of monomers is 0.5 liter per hour. The reaction temperature is maintained at about 50° C. The aqueous suspension of polymer obtained is discharged from an overflow tube, filtered, washed repeatedly with water, with acetone, and then again with water to eliminate all the foreign substances and the unreacted monomers, and dried in an oven at 80° C. for 12 hours.

Under standard polymerization conditions, there are obtained about 350 grams per hour of copolymer in which the acrylonitrile, the vinyl acetate and the sodium benzene sulfonate p-methylallylether are copolymerized in proportions of 92.5:7:0.5.

The results of the measurements carried out on the resultant polymer are set forth in Table 1.

EXAMPLE 14

The polymerization described in Example 13 is repeated, using an amount of catalyst of 0.8 part and an amount of activator of 0.8 part, the ratio of activator to catalyst being 1:1 in the presence of 5% sodium sulfate.

The results of the measurements carried out on the resultant copolymer are set forth in Table 1.

EXAMPLES 15 TO 28

The polymers obtained in Examples 1 to 14 are used to obtain fibers by spinning, in customary manner, solutions in dimethylformamide by a wet-spinning process.

The characteristics of the fibers obtained are set forth in Table 2, in which the dyeability is expressed as the amount of dyestuff Sevron Blue 2G of 26% by weight absorbed by the fiber after boiling for 3 hours at 100° C.

TABLE 1

| Example No. | Conversion, percent | Intrinsic viscosity ($\eta$) in ml./gr.-1. | Original color | Sensitivity to heat | Dyeability |
|---|---|---|---|---|---|
| 1 | 68.5 | 149 | IP=98.5<br>B=94.7 | ΔIP=10.5<br>ΔB=15.2 | 10.2 |
| 2 | 70 | 151 | IP=99.1<br>B=94 | ΔIP=7.1<br>ΔB=9.6 | 10.5 |
| 3 | 69.2 | 168 | IP=99.4<br>B=95.2 | ΔIP=8.4<br>ΔB=10 | 10 |
| 4 | 75 | 159 | IP=99.7<br>B=96 | ΔIP=8.5<br>ΔB=7 | 9.8 |
| 5 | 70 | 150 | IP=99.4<br>B=96.1 | ΔIP=9.2<br>ΔB=11 | 10.2 |
| 6 | 75 | 129 | IP=99.2<br>B=94.9 | ΔIP=9.1<br>ΔB=7.3 | 11.4 |
| 7 | 71 | 154 | IP=98.2<br>B=94.4 | ΔIP=19.1<br>ΔB=26 | 16.5 |
| 8 | 74 | 162 | IP=99<br>B=94.8 | ΔIP=12.9<br>ΔB=12.3 | 16.2 |
| 9 | 68 | 148 | IP=98.6<br>B=94.8 | ΔIP=11.2<br>ΔB=16 | 15.6 |
| 10 | 79.6 | 141 | IP=99.2<br>B=95.6 | ΔIP=9.8<br>ΔB=10.6 | 15.4 |
| 11 | 71 | 160 | IP=98.8<br>B=94.5 | ΔIP=13.2<br>ΔB=21.5 | 9.7 |
| 12 | 74 | 148 | IP=99.1<br>B=95.3 | ΔIP=9.5<br>ΔB=11 | 9.8 |
| 13 | 67.8 | 154 | IP=98.8<br>B=95.3 | ΔIP=12.2<br>ΔB=16.6 | 14.9 |
| 14 | 81.1 | 138 | IP=99.1<br>B=95.5 | ΔIP=10.5<br>ΔB=11.6 | 15.4 |

TABLE 2

| | Type of polymer used | Dyeability, percent | DWL | IP | B | ΔIP | ΔB | Ten | Elongation, percent |
|---|---|---|---|---|---|---|---|---|---|
| Example: | | | | | | | | | |
| 15 | Polymer Ex. 1 | 7 | 575 | 92.6 | 76 | 3.4 | 3.7 | 2.8 | 30 |
| 16 | Polymer Ex. 2 | 6.8 | 574 | 92.8 | 76 | 2.1 | 2.2 | 3 | 33 |
| 17 | Polymer Ex. 3 | 7 | 575 | 92.7 | 76.1 | 1.8 | 1.6 | 2.95 | 29 |
| 18 | Polymer Ex. 4 | 6.5 | 576 | 93.8 | 77.5 | 2.1 | 0.5 | 3.1 | 32.9 |
| 19 | Polymer Ex. 5 | 6.8 | 575 | 93.1 | 76.3 | 2.2 | 1.9 | 3 | 31 |
| 20 | Polymer Ex. 6 | 7 | 577 | 93.7 | 77.2 | 1.9 | 0.7 | 3.1 | 32 |
| 21 | Polymer Ex. 7 | 14.5 | 578 | 91.3 | 74.2 | 5.8 | 4.1 | 2.95 | 33.4 |
| 22 | Polymer Ex. 8 | 14.7 | 575 | 92.9 | 78 | 2.8 | 2 | 2.7 | 31.8 |
| 23 | Polymer Ex. 9 | 14.2 | 574 | 92.5 | 74.1 | 3.9 | 3 | 2.9 | 34 |
| 24 | Polymer Ex. 10 | 14 | 573 | 93.9 | 77.2 | 2.7 | 2.2 | 3 | 31 |
| 25 | Polymer Ex. 11 | 7.2 | 574.8 | 92.8 | 77.1 | 3.4 | 3.4 | 2.9 | 33 |
| 26 | Polymer Ex. 12 | 7.6 | 575 | 93 | 77.6 | 2.5 | 1.8 | 3 | 34 |
| 27 | Polymer Ex. 13 | 14.4 | 573.7 | 92.5 | 73.8 | 4.1 | 2.8 | 2.7 | 33 |
| 28 | Polymer Ex. 14 | 14.5 | 574.5 | 94.2 | 77.4 | 2.5 | 2 | 2.9 | 31 |

We claim:

1. In a method for the production of interpolymers containing at least eighty-five percent by weight acrylonitrile, said interpolymers having a high degree of whiteness and resistance to heat, the improvement which comprises producing said interpolymers from the reaction of acrylonitrile with at least one vinyl comonomer, using as a catalyst therein a redox system in the presence from 0.5 to 10 percent by weight based on monomers of a water-soluble sulfate of a metal of Group I of the Periodic System.

2. A method as claimed in claim 1 wherein the said salt is from the group consisting of sodium sulfate and potassium sulfate.

3. A method as claimed in claim 1 wherein at least one of said vinyl comonomers is characterized by having a large side group of steric dimensions in its molecule.

4. A method as claimed in claim 3 wherein there is included in the said reaction, in addition to said vinyl comonomer having a large side group of steric dimensions, a vinyl monomer having free acid functions.

5. A method as claimed in claim 3 wherein the said vinyl comonomer having the said large side group is selected from the group of materials consisting of alkyl, aryl, and cycloalkyl acrylates, alkyl, aryl and cycloalkyl methacrylates, acrylamides and the corresponding alkyl derivatives, unsaturated ketones, vinyl carboxylates, vinyl ethers, styrene and their alkyl derivatives.

6. A method as claimed in claim 5 wherein the said vinyl monomer having free acid functions is selected from the group consisting of itaconic acid, cinnamic acid, maleic acid and anhydride, carboxy vinyl phthalic acid, sulfonic acids containing an olefin-unsaturated bond, and the corresponding salts of an alkaline metal or ammonium.

References Cited

UNITED STATES PATENTS

| 3,020,265 | 2/1962 | Tietz | 260—79.3 |
| 3,141,869 | 7/1964 | Dennstedt | 260—85.5 |
| 3,202,641 | 8/1965 | Nakajima et al. | 260—79.3 |
| 3,410,835 | 11/1968 | Mazzolini et al. | 260—78.5 |

WILLIAM SHORT, Primary Examiner

L. L. LEE, Assistant Examiner

U.S. Cl. X.R.

260—78.5, 79.3, 80.5, 85.5

UNITED STATES PATENT OFFICE
CERTIFICATE OF CORRECTION

Patent No. 3,505,290　　　　　　　　　　　　　　　　April 7, 1970

Corrado Mazzolini et al.

It is certified that error appears in the above identified patent and that said Letters Patent are hereby corrected as shown below:

Column 3, line 20, "2.2" should read -- 2.3 --. Column 5, line 16, "23.1" should read -- 2.3:1 --.

Signed and sealed this 16th day of March 1971.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents